(12) United States Patent
Ozawa

(10) Patent No.: US 8,331,513 B2
(45) Date of Patent: *Dec. 11, 2012

(54) CLOCK DATA RESTORATION DEVICE

(75) Inventor: Seiichi Ozawa, Wako (JP)

(73) Assignee: Thine Electronics, Inc., Tokyo (JP)

( * ) Notice: Subject to any disclaimer, the term of this patent is extended or adjusted under 35 U.S.C. 154(b) by 166 days.

This patent is subject to a terminal disclaimer.

(21) Appl. No.: 12/594,916

(22) PCT Filed: Oct. 28, 2008

(86) PCT No.: PCT/JP2008/069555
§ 371 (c)(1),
(2), (4) Date: Dec. 22, 2009

(87) PCT Pub. No.: WO2009/060763
PCT Pub. Date: May 14, 2009

(65) Prior Publication Data
US 2011/0285432 A1    Nov. 24, 2011

(30) Foreign Application Priority Data
Nov. 6, 2007 (JP) ................................ P2007-289011

(51) Int. Cl.
 H04L 7/00 (2006.01)
 H04L 25/00 (2006.01)
(52) U.S. Cl. ....................................... 375/355; 375/371
(58) Field of Classification Search .................. 375/326, 375/350, 355, 371
See application file for complete search history.

(56) References Cited

U.S. PATENT DOCUMENTS

| 5,297,164 | A | 3/1994 | McCabe | |
|---|---|---|---|---|
| 7,315,598 | B2 | 1/2008 | Lee et al. | |
| 7,508,872 | B2 | 3/2009 | Yamazaki | |
| 2005/0201491 | A1* | 9/2005 | Wei | 375/326 |
| 2008/0049822 | A1* | 2/2008 | Zerbe et al. | 375/229 |
| 2009/0232195 | A1 | 9/2009 | Ozawa | |
| 2010/0205343 | A1* | 8/2010 | Tell | 710/305 |

FOREIGN PATENT DOCUMENTS

| JP | 62-29236 A | 2/1987 |
|---|---|---|
| JP | 5-75653 A | 3/1993 |
| JP | 7-221800 A | 8/1995 |
| JP | 2004-507963 A | 3/2004 |
| JP | 2007-151044 A | 6/2007 |
| WO | 2007/058279 A1 | 5/2007 |
| WO | 2008/044406 A1 | 4/2008 |

OTHER PUBLICATIONS

Chinese Office Action dated Feb. 24, 2012 issued by the State Intellectual Property Office of P.R. China in corresponding Chinese Patent Application No. 200880011621.2.

* cited by examiner

*Primary Examiner* — Don N Vo
(74) *Attorney, Agent, or Firm* — Sughrue Mion, PLLC

(57) ABSTRACT

A clock data restoration device 1, which restores a clock signal and data on the basis of an inputted digital signal, comprises an equalizer 10, a sampler 20, a clock generator 30, an equalizer controller 40, and a phase monitor 50. A clock signal CK or CKX as a clock signal restored on the basis of the input digital signal is generated through loop processing by the sampler 20 and the clock generator 30. The level adjustment amount of a high frequency component of the digital signal by the equalizer 10 is controlled through loop processing by the equalizer 10, the sampler 20 and the equalizer controller 40.

5 Claims, 14 Drawing Sheets

*Fig.6*

| D(n-1) | DX(n-1) | D(n) | UP | DN |
|---|---|---|---|---|
| 0 | 0 | 0 | 0 | 0 |
| 0 | 0 | 1 | 0 | 1 |
| 0 | 1 | 0 | 0 | 0 |
| 0 | 1 | 1 | 1 | 0 |
| 1 | 0 | 0 | 1 | 0 |
| 1 | 0 | 1 | 0 | 0 |
| 1 | 1 | 0 | 0 | 1 |
| 1 | 1 | 1 | 0 | 0 |

CLOCK DATA RESTORATION DEVICE

TECHNICAL FIELD

The present invention relates to a device for restoring a clock signal and data on the basis of an inputted digital signal.

BACKGROUND ART

The waveform of a digital signal that is outputted by a transmitter deteriorates while being transmitted from the transmitter to a receiver via a transmission channel. Therefore, a clock signal and data must be restored on the receiver side. Clock data restoration devices for performing such restoration are disclosed in, for instance, Patent documents 1 and 2.

In the devices disclosed in the documents, each bit data is detected at three timings in consideration of fluctuations in data transition time in the deteriorated-waveform digital signal. Among the three timings at which each bit data is detected, the first timing is set in the vicinity of an initial time of a data stable period of the bit, the second timing is set in the vicinity of a terminal time of the data stable period of the bit, and the third timing is set at a central time between the first timing and the second timing.

In the device disclosed in Patent document 1, the clock signal is restored by adjusting the timings in such a manner that the data detected at the three timings match, for each bit. Data is restored then by detecting each bit data at the central third timing.

In the device disclosed in Patent document 2, meanwhile, the clock signal is restored by adjusting the timings in such a manner that the bit error rates at the first timing and the second timing (i.e. the ratios by which data detected at each timing differs from the data detected at a central third timing) are equal to each other and lie within an initial set range. Data is restored then by detecting the data of each bit at the central third timing.

Patent document 1: Japanese Patent Application Laid-open No. 7-221800
Patent document 2: Published Japanese translation of a PCT application No. 2004-507963

DISCLOSURE OF THE INVENTION

Problems to be Solved by the Invention

The data transition time of the input digital signal fluctuates on account of transmitter clock jitter, which is caused by power source voltage fluctuations in the transmitter that sends the digital signal, and on account of other noise. The data transition time fluctuates also due to, for instance, intersymbol interference, which is caused by a blending of irregular data patterns in the digital signal and by attenuation in the transmission channel. In the above-described conventional devices, the clock signal and data may fail to be restored when such transmitter clock jitter and intersymbol interference are substantial.

With a view to solving the above problems, it is an object of the present invention to provide a clock data restoration device that allows a clock signal and data to be restored stably even in case of substantial transmitter clock jitter and/or intersymbol interference.

Means for Solving the Problems

The clock data restoration device according to the present invention restores a clock signal and data on the basis of an inputted digital signal, and comprises an equalizer, a sampler, a clock generator and an equalizer controller. Preferably, the clock data restoration device according to the present invention further comprises a phase monitor.

The equalizer adjusts a level of a high frequency component of the inputted digital signal and outputs the adjusted digital signal.

The sampler receives an input of a clock signal CK and a clock signal CKX which have a same cycle T, and an input of the digital signal outputted by the equalizer. The sampler samples, holds, and outputs a value D(n) of the digital signal at a time $t_C$ indicated by the clock signal CK, and samples, holds, and outputs a value DX(n) of the digital signal at a time $t_X$ indicated by the clock signal CKX, in each n-th period T(n) of the cycle. Herein, "$t_C < t_X$", and n is an integer.

In each period T(n), the clock generator adjusts the cycle T or a phase on the basis of the value D(n) and the value DX(n) outputted by the sampler, in such a manner that a phase difference between the clock signal CK and the digital signal decreases, and outputs to the sampler the clock signal CK and the clock signal CKX satisfying a relationship "$t_X - t_C = T/2$".

In each period T(n), the equalizer controller controls a level adjustment amount of the high frequency component of the digital signal by the equalizer, on the basis of the value D(n) and the value DX(n) outputted by the sampler.

In each period T(n), the phase monitor detects a phase relationship between the clock signal CK and the digital signal, on the basis of the value D(n) and the value DX(n) outputted by the sampler, and, when the phase difference is greater than a predetermined value, stops control of the level adjustment amount of the digital signal by the equalizer controller.

The level of a high frequency component of a digital signal inputted to the clock data restoration device is firstly adjusted by the equalizer, and the adjusted digital signal is then inputted to the sampler. The sampler also receives an input of a clock signal CK and a clock signal CKX which have the same cycle T. Then, the sampler samples, holds, and outputs a value D(n) of the digital signal at a time indicated by the clock signal CK, and samples, holds, and outputs a value DX(n) of the digital signal at a time indicated by the clock signal CKX, in each n-th period T(n) of the cycle. The value D(n) and value DX(n) outputted by the sampler are inputted to the clock generator, the equalizer controller and the phase monitor.

The clock generator adjusts a cycle T or a phase on the basis of the value D(n) and the value DX(n) outputted by the sampler, in such a manner that a phase difference between the clock signal CK and the digital signal decreases, and outputs to the sampler the clock signal CK and the clock signal CKX satisfying a relationship "$t_X - t_C = T/2$". Loop processing by the sampler and the clock generator generates a clock signal CK or CKX as the clock signal restored on the basis of the input digital signal.

The equalizer controller controls a level adjustment amount of a high frequency component of the digital signal by the equalizer on the basis of the value D(n) and the value DX(n) outputted by the sampler.

Preferably, control by the equalizer controller is permitted or stopped on the basis of the detection result of the phase relationship by the phase monitor. That is, the phase monitor detects a phase relationship between the clock signal CK and the digital signal on the basis of the value D(n) and the value DX(n) outputted by the sampler. When the phase difference is greater than a predetermined value, control of the level adjustment amount of the digital signal by the equalizer controller is stopped, and control of the level adjustment amount of the digital signal by the equalizer controller is permitted when the phase difference is equal to or less than a predetermined value.

Thus, the clock data restoration device according to the present invention controls the level adjustment amount of a high frequency component of a digital signal, in the equalizer, through loop processing by the equalizer, the sampler, and the equalizer controller. Preferably, the control is stopped by the phase monitor when the phase difference between the clock signal CK and the digital signal is greater than a predetermined value. The clock signal and data can be more accurately restored as a result.

Preferably, the clock generator adjusts the cycle T or the phase on the basis of an UP signal which has a significant value when "D(n−1)≠DX(n−1)=D(n)" and a DN signal which has a significant value when "D(n−1)=DX(n−1)≠D(n)", and outputs the clock signal CK and the clock signal CKX.

Preferably, the phase monitor detects the phase relation between the clock signal CK and the digital signal on the basis of an UP signal which has a significant value when "D(n−1)≠DX(n−1)=D(n)" and a DN signal which has a significant value when "D(n−1)=DX(n−1)≠D(n)".

Preferably, when in each period T(n) either the UP signal or the DN signal does not have a significant value in ten previous consecutive periods (T(n−9) to T(n)) which include the period, the phase monitor judges that the phase difference is greater than the predetermined value, and stops control of the level adjustment amount of the digital signal by the equalizer controller.

Effect of the Invention

The present invention allows a clock signal and data to be restored stably even in case of substantial transmitter clock jitter and/or intersymbol interference.

BRIEF DESCRIPTION OF THE DRAWINGS

FIG. 6 is a table illustrating a truth table of I/O values of a phase relationship detection circuit 31 comprised in the clock generator 30.

Figure 1:
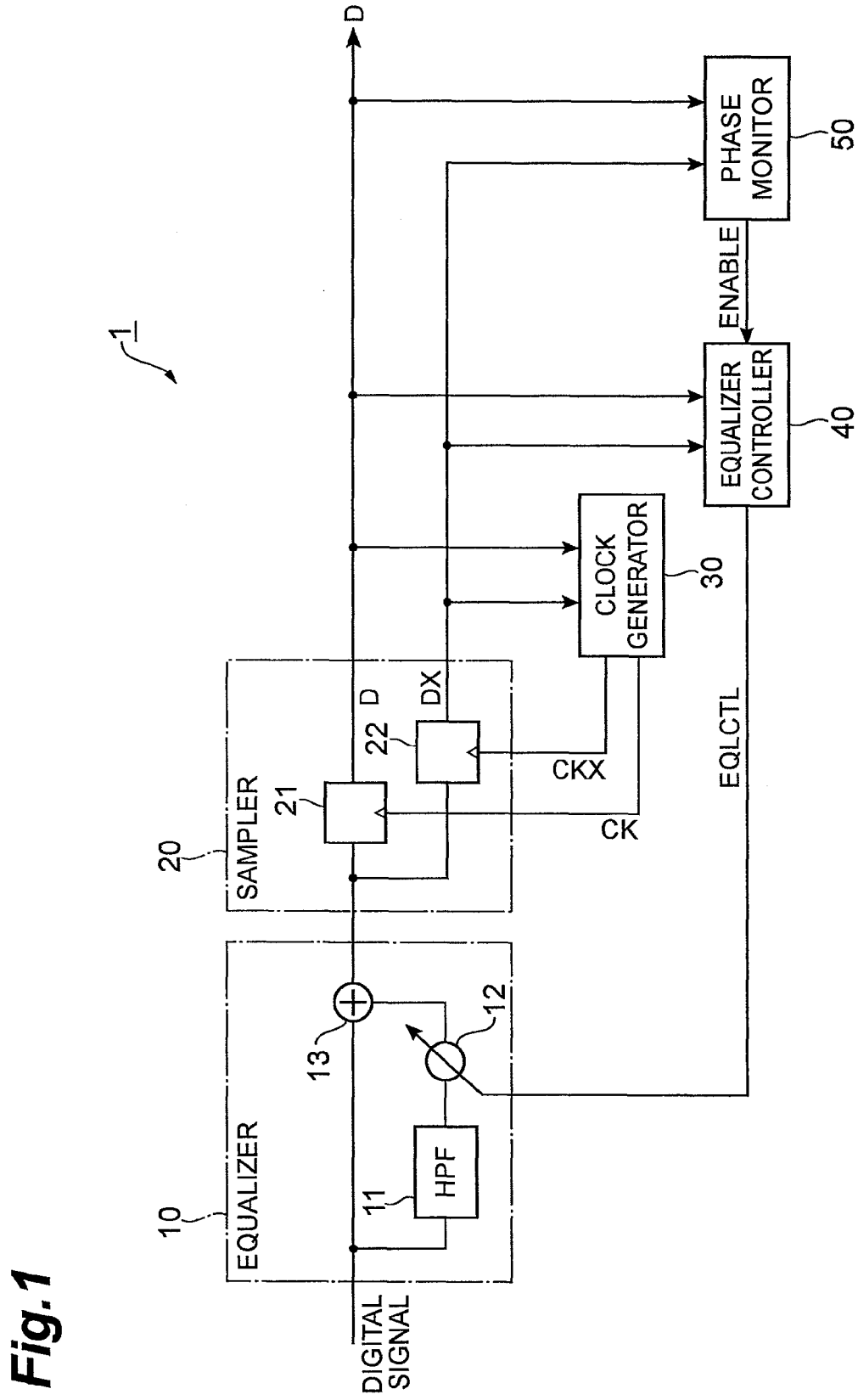
FIG. 1 is a schematic diagram illustrating a clock data restoration device 1 according to an embodiment.

EXPLANATION OF REFERENCE NUMERALS 1 clock data restoration device
10 equalizer
20 sampler
30 clock generator
40 equalizer controller
50 phase monitor

BEST MODE FOR CARRYING OUT THE INVENTION

A best mode for carrying out the invention will be explained next with reference to accompanying drawings. In the explanation of the drawings, identical elements are denoted with identical reference numerals, and recurrent explanations thereof are omitted.

FIG. 1 is a schematic diagram illustrating a clock data restoration device 1 according to the present embodiment. The clock data restoration device 1 is a device which restores a clock signal and data on the basis of an inputted digital signal, and comprises an equalizer 10, a sampler 20, a clock generator 30, an equalizer controller 40 and a phase monitor 50.

Figure 2:
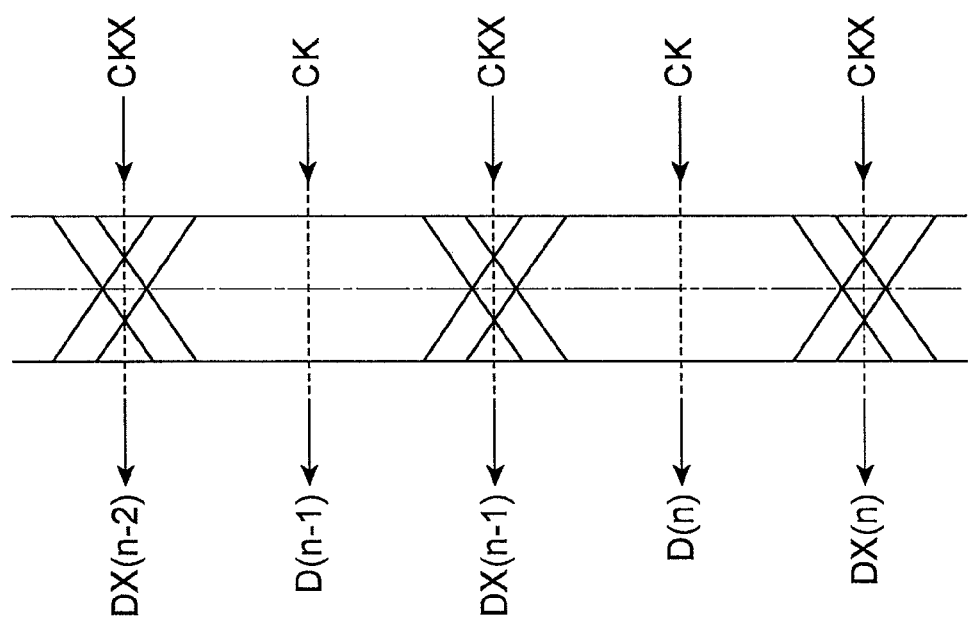
FIG. 2 is a diagram illustrating timing of digital signal data in the clock data restoration device 1 according to the embodiment.

FIG. 2 is a diagram that illustrates sampling timing of digital signal data in the clock data restoration device 1 according to the present embodiment. The figure shows schematically an eye pattern of an input digital signal, shows the timings of a clock signal CK and a clock signal CKX that are outputted by the clock generator 30 and inputted to the sampler 20, and shows timings of a digital value D(n) and a value DX(n) which are outputted by the sampler 20.

The equalizer 10 adjusts the level of a high frequency component of an inputted digital signal, and outputs the adjusted digital signal to the sampler 20. The equalizer 10 comprises a high pass filter circuit (HPF) 11, an amplifier circuit 12 and an adder circuit 13. As described below, these three circuits are not necessarily distinctly separated within the equalizer 10.

The high pass filter circuit 11 selectively allows a high frequency component of the input digital signal to pass, and outputs the resulting signal to the amplifier circuit 12. The amplifier circuit 12 amplifies the signal outputted by the high pass filter circuit 11 and outputs the same to the adder circuit 13. The gain of the amplifier circuit 12 is set upon receipt of a value EQLCTL which is outputted by the equalizer controller 40. Further, the adder circuit 13 receives an input of the input digital signal and an input of a signal outputted by the amplifier circuit 12, and outputs to the sampler 20 the result of adding these inputs. The high frequency component of the digital signal outputted by the equalizer 10 and inputted to the sampler 20 is thus amplified. The transmission loss undergone by the high frequency component of the digital signal is compensated thereby.

The sampler 20 receives an input of the clock signal CK and the clock signal CKX, which have the same cycle T, and an input of the digital signal outputted by the equalizer 10. At each n-th period T(n) of the cycle, the sampler 20 samples, holds, and outputs a digital signal value D(n) at a time $t_C$ indicated by the clock signal CK, and samples, holds, and outputs a digital signal value DX(n) at a time $t_X$ indicated by the clock signal CKX, wherein "$t_C < t_X$" and n is an integer.

The sampler 20 comprises two latch circuits 21, 22. The latch circuit 21, which receives the input of the digital signal outputted by the equalizer 10, and the input of the clock signal CK outputted by the clock generator 30, samples, holds, and outputs a digital signal value D(n) at a time indicated by the clock signal CK, in each period T(n). The latch circuit 22, which receives the input of the digital signal outputted by the equalizer 10, and the input of the clock signal CKX outputted by the clock generator 30, samples, holds, and outputs a digital signal value DX(n) at a time indicated by the clock signal CKX, in each period T(n).

In each period T(n), the clock generator 30 adjusts the cycle T or the phase on the basis of the value D(n) and the value DX(n) outputted by the sampler 20, in such a manner that the phase difference between the clock signal CK and the digital signal decreases, and outputs a clock signal CK and a clock signal CKX satisfying the relationship "$t_X - t_C = T/2$" to the sampler 20. The clock signal CK indicates the timing for detecting the digital signal data in the sampler 20 at the center time of each bit period, while the clock signal CKX indicates the timing for detecting digital signal data in the sampler 20 at the transition time from a certain bit to the next bit.

Each of the two clock signals, CK and CKX, may be single phase clock signals or multiphase clock signals. Assuming for instance that the clock signal CK has four phases, then there are employed four clock signals CK<1>, CK<2>, CK<3>, and CK<4>, whose respective cycles are 4T and whose phases differ from one another by πc/2 increments, such that the sampler is provided with four latch circuits corresponding to these four clock signals CK<1> to CK<4>. The circuit scale of the sampler becomes larger in the case of multiphase clock signals, but the speed required of each circuit block is then lower.

In each period T(n), the equalizer controller 40 controls the level adjustment amount of the high frequency component of the digital signal by the equalizer 10, on the basis of the value D(n) and the value DX(n) outputted by the sampler 20. The equalizer controller 40 outputs a value EQLCTL, necessary for carrying out that control, to the equalizer 10.

The phase monitor 50 detects a phase relationship between the clock signal CK and digital signal on the basis of the value D(n) and the value DX(n) which are outputted by the sampler 20, in each period T(n). The phase monitor 50 then stops control of the level adjustment amount of the digital signal by the equalizer controller 40 when the phase difference is greater than a predetermined value, and permits control of the level adjustment amount of the digital signal by the equalizer controller 40 when the phase difference is equal to or less than a predetermined value. The phase monitor 50 outputs to the equalizer controller 40 a value ENABLE for indicating control enablement or stop in the equalizer controller 40.

In the clock data restoration device 1 according to the present embodiment, the level of the high frequency component of an inputted digital signal is firstly adjusted in the equalizer 10, and then the digital signal is inputted to the sampler 20. The sampler 20 also receives an input of a clock signal CK and a clock signal CKX which have the same cycle T. In the sampler 20, the digital signal value D(n) at the time indicated by the clock signal CK is sampled, held, and outputted by the latch circuit 21, at each n-th period T(n) of the cycle, and the digital signal value DX(n) at the time indicated by the clock signal CKX is sampled, held, and outputted by the latch circuit 22. The value D(n) and value DX(n) outputted by the sampler 20 are inputted to the clock generator 30, the equalizer controller 40 and the phase monitor 50.

The clock generator 30 adjusts the cycle T or the phase on the basis of the value D(n) and the value DX(n) outputted by the sampler 20 in such a manner that the phase difference between the clock signal CK and the digital signal decreases, and outputs the clock signal CK and the clock signal CKX satisfying the relationship "$t_X - t_C = T/2$" to the sampler 20. Loop processing by the sampler 20 and the clock generator 30 generates a clock signal CK or CKX as the clock signal restored on the basis of the input digital signal.

The equalizer controller 40 controls the level adjustment amount of the high frequency component of the digital signal in the equalizer 20, on the basis of the value D(n) and the value DX(n) outputted by the sampler 20. A value EQLCTL for carrying out that control is outputted by the equalizer controller 40 and inputted to the equalizer 10.

Preferably, control by the equalizer controller 40 is permitted or stopped on the basis of the detection result of the phase relationship by the phase monitor 50. That is, the phase monitor 50 detects a phase relationship between the clock signal CK and the digital signal on the basis of the value D(n) and the value DX(n) outputted by the sampler 20. Control of the level adjustment amount of the digital signal by the equalizer controller 40 is stopped when the phase difference is greater than a predetermined value, while control of the level adjustment amount of the digital signal by the equalizer controller 40 is permitted when the phase difference is equal to or less than a predetermined value. The phase monitor 50 outputs a value ENABLE for indicating control permission or discontinuation of control by the equalizer controller 40, and inputs the value ENABLE to the equalizer controller 40.

Thus, the clock data restoration device 1 according to the present embodiment controls the level adjustment amount of the high frequency component of a digital signal, in the equalizer 10, through loop processing by the equalizer 10, the sampler 20, and the equalizer controller 30. Preferably, the control is stopped by the phase monitor 50 when the phase difference between the clock signal CK and the digital signal is greater than a predetermined value. The clock signal and data can be more accurately restored as a result.

Figure 3:
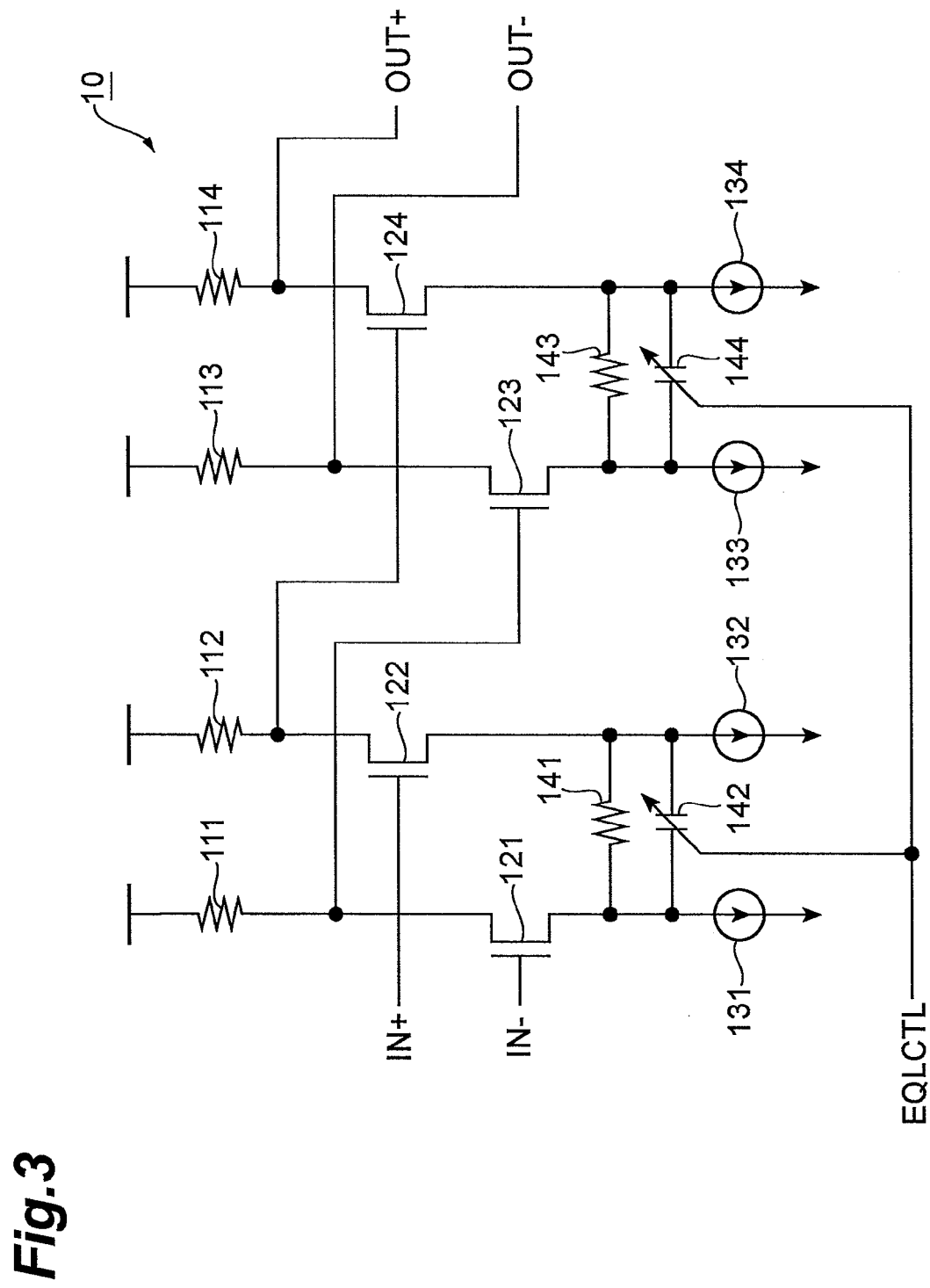
FIG. 3 is a circuit diagram of an equalizer 10 comprised in the clock data restoration device 1 according to the embodiment.

FIG. 3 is a circuit diagram of the equalizer 10 comprised in the clock data restoration device 1 according to the present embodiment. The equalizer 10 comprises resistors 111 to 114, field effect transistors 121 to 124, constant current sources 131 to 134, resistors 141, 143 and capacitors 142, 144. The capacitance value of the capacitors 142, 144 is variable and is set based on the value EQLCTL outputted by the equalizer controller 40.

The resistor 111, the field effect transistor 121 and the constant current source 131 are connected in series, in this order. A reference voltage is applied to the resistor 111 side, while the constant current source 131 side is connected to ground. The resistor 112, the field effect transistor 122 and the constant current source 132 are connected in series, in this order. A reference voltage is applied to the resistor 112 side, while the constant current source 132 side is connected to ground. The resistor 113, the field effect transistor 123 and the constant current source 133 are connected in series, in this order. A reference voltage is applied to the resistor 113 side, while the constant current source 133 side is connected to ground. The resistor 114, the field effect transistor 124 and the constant current source 134 are connected in series, in this order. A reference voltage is applied to the resistor 114 side, while the constant current source 134 side is connected to ground.

The resistor 141 and the capacitor 142, connected in parallel to the each other, are provided between a connecting point of the field effect transistor 121 and the constant current source 131, and a connecting point of the field effect transistor 122 and the constant current source 132. The resistor 143 and the capacitor 144, connected in parallel to the each other, are provided between a connecting point of the field effect transistor 123 and the constant current source 133, and a connecting point of the field effect transistor 124 and the constant current source 134. The gate terminal of the field effect transistor 123 is connected to a connecting point of the resistor 111 and the field effect transistor 121. The gate terminal of the field effect transistor 124 is connected to a connecting point of the resistor 112 and the field effect transistor 122.

A digital signal (IN+/IN−) inputted to the equalizer 10 is inputted between the gate terminals of the field effect transistors 121, 122. The digital signal (OUT+/OUT−) outputted by the equalizer 10 is outputted as a potential difference between a connecting point of the resistor 113 and the field effect transistor 123 and a connecting point of the resistor 114 and the field effect transistor 124.

In the equalizer 10 thus configured, the capacitance values of the capacitors 142, 144, and the gain of the high frequency component of the input digital signal are set in accordance with the value EQLCTL. The gain of the high frequency component of the input digital signal increases as the capacitance values of the capacitors 142, 144 become larger. The high frequency component of the input digital signal (IN+/IN−) is amplified in accordance with the gain, and is outputted as an output digital signal (OUT+/OUT−).

Figure 4:
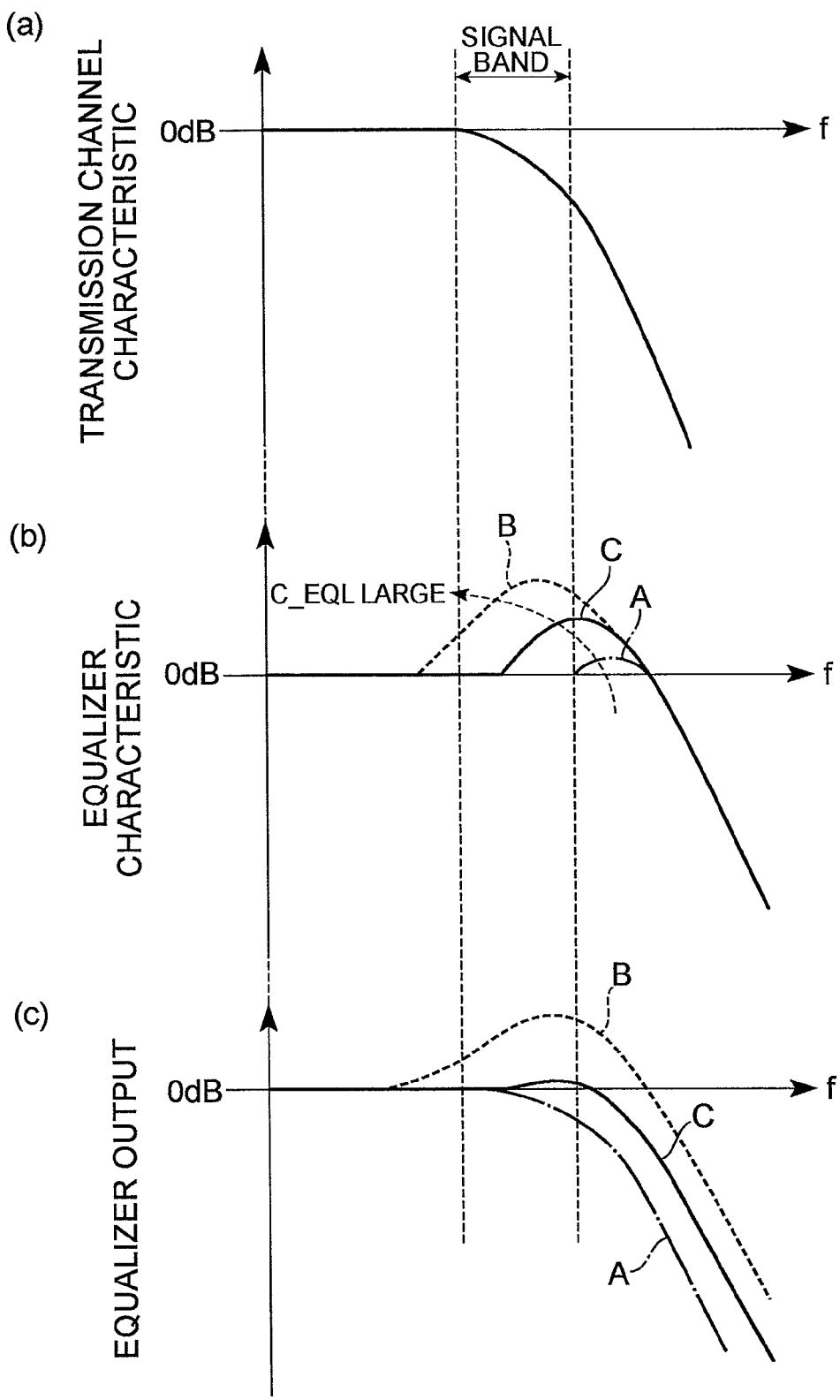
FIG. 4 is a diagram illustrating various amplification characteristics of the equalizer 10.

FIG. 4 illustrates various amplification characteristics of the equalizer 10. FIG. 4(a) illustrates a loss characteristic of the transmission channel joined to the input terminal of the clock data restoration device 1. FIG. 4(b) illustrates an amplification characteristic of the equalizer 10. FIG. 4(c) illustrates comprehensively the loss characteristic of the transmission channel and the amplification characteristic of the equalizer 10. As illustrated in FIG. 4(a), the digital signal inputted to the input terminal of the clock data restoration device 1 via the transmission channel undergoes loss in the high frequency component, within the signal band, during transmission. In order to compensate the loss of the high frequency component of the digital signal during transmission, the equalizer 10 increases an equalizer control value C_EQL(EQLCTL) to amplify the high frequency component of the input digital signal, as illustrated in FIG. 4(b), and outputs an output digital signal after the above compensation, as illustrated in FIG. 4(c).

In FIG. 4(b) and FIG. 4(c), the dotted-dashed line A denotes an instance where compensation (gain during amplification of the high frequency component) in the equalizer 10 is undersize, and the high frequency component of the output digital signal after compensation remains small. The dotted line B illustrates an instance where compensation (gain during amplification of the high frequency component) in the equalizer 10 is oversize, and there increases the high frequency component of the output digital signal after compensation. The solid line C illustrates an instance where compensation (gain during amplification of the high frequency component) in the equalizer 10 lies within an appropriate range, and the output digital signal after compensation becomes substantially flat within the signal band.

The magnitude of the compensation (gain during amplification of the high frequency component) in the equalizer 10 depends on the capacitance values of the capacitors 142, 144, which are set in accordance with the value EQLCTL outputted by the equalizer controller 40. In the clock data restoration device 1 according to the present embodiment, the compensation (gain during amplification of the high frequency component) in the equalizer 10 is controlled so as to be kept within an appropriate range by adjusting the value EQLCTL in the equalizer controller 40 to lie within an appropriate range.

Figure 5:
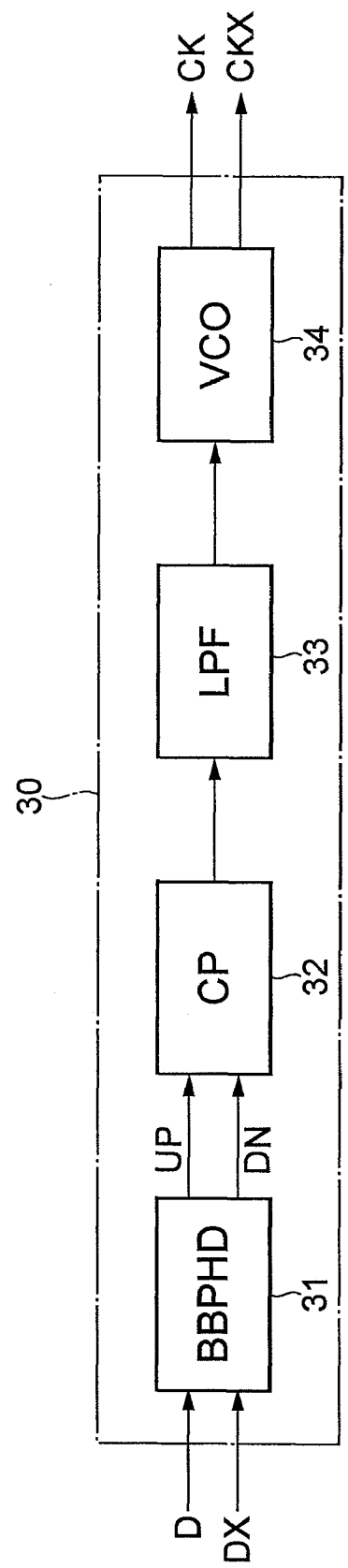
FIG. 5 is a schematic diagram of an equalizer controller 30 comprised in the clock data restoration device 1 according to the embodiment.

FIG. 5 is a schematic diagram of the clock generator 30 comprised in the clock data restoration device 1 according to the present embodiment. The clock generator 30, which generates the clock signal CK and clock signal CKX on the basis of the value D(n) and the value DX(n) outputted by the sampler 20, comprises a phase relationship detection circuit (BBPHD) 31, a charge pump circuit (CP) 32, a low-pass filter circuit (LPF) 33, and a voltage control oscillation circuit (VCO) 34.

The phase relationship detection circuit 31 performs logic processing in accordance with the truth table illustrated in FIG. 6, on the basis of the value D(n) and the value DX(n) outputted by the sampler 20, and outputs an UP signal and a DN signal. Specifically, the phase relationship detection circuit 31 outputs an UP signal which has a significant value when "D(n−1)≠DX(n−1)=D(n)" and outputs a DN signal which has a significant value when "D(n−1)=DX(n−1)≠D(n)", as signals representing the phase relationship.

Figure 7:
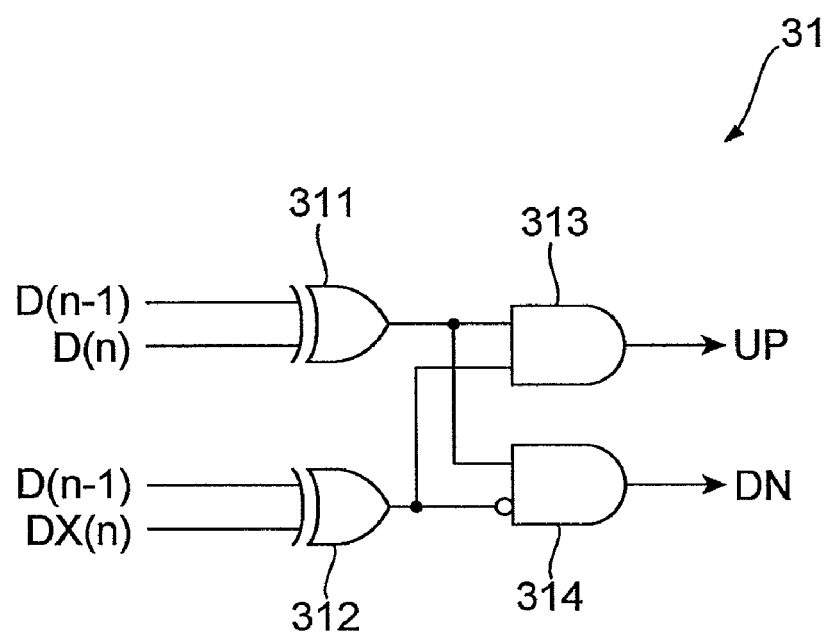
FIG. 7 is a circuit diagram of the phase relationship detection circuit 31 comprised in the clock generator 30.

As illustrated in the circuit diagram of FIG. 7, the phase relationship detection circuit 31 may comprise an exclusive-OR circuit 311 to which the value D(n−1) and the value D(n) are inputted, an exclusive-OR circuit 312 to which the value D(n−1) and the value DX(n) are inputted, an AND circuit 313 to which the output values of the exclusive-OR circuit 311 and exclusive-OR circuit 312 are inputted and which outputs an UP signal, and an AND circuit 314 to which the output value of the exclusive-OR circuit 311 and the logical NOT value of the output value of the exclusive-OR circuit 312 are inputted and which outputs the DN signal.

When the UP signal has a significant value, the phase of the clock signal CK lags the input digital signal, and hence it is necessary to bring forward the phases of the clock signal CK and the clock signal CKX. When the DN signal has a significant value, the phase of the clock signal CK is ahead of the input digital signal, and hence it its necessary to delay the phases of the clock signal CK and the clock signal CKX.

Therefore, the charge pump circuit 32 outputs either a charging current pulse or a discharging current pulse to the low pass filter circuit 33 depending on whether any among the UP signal and the DN signal outputted by the phase relationship detection circuit 31 has a significant value. The low pass filter circuit 33 receives an input of a current pulse outputted by the charge pump circuit 32, and increases or reduces the output voltage value on the basis of whether the input current pulse is a charge current pulse or a discharge current pulse. The voltage control oscillation circuit 34 then generates a clock signal CK and clock signal CKX of a cycle corresponding to the output voltage value from the low pass filter circuit 33. The cycles of the clock signal CK and the clock signal CKX generated by the clock generator 30 are adjusted thus on the basis of the UP signal and the DN signal.

Figure 8:
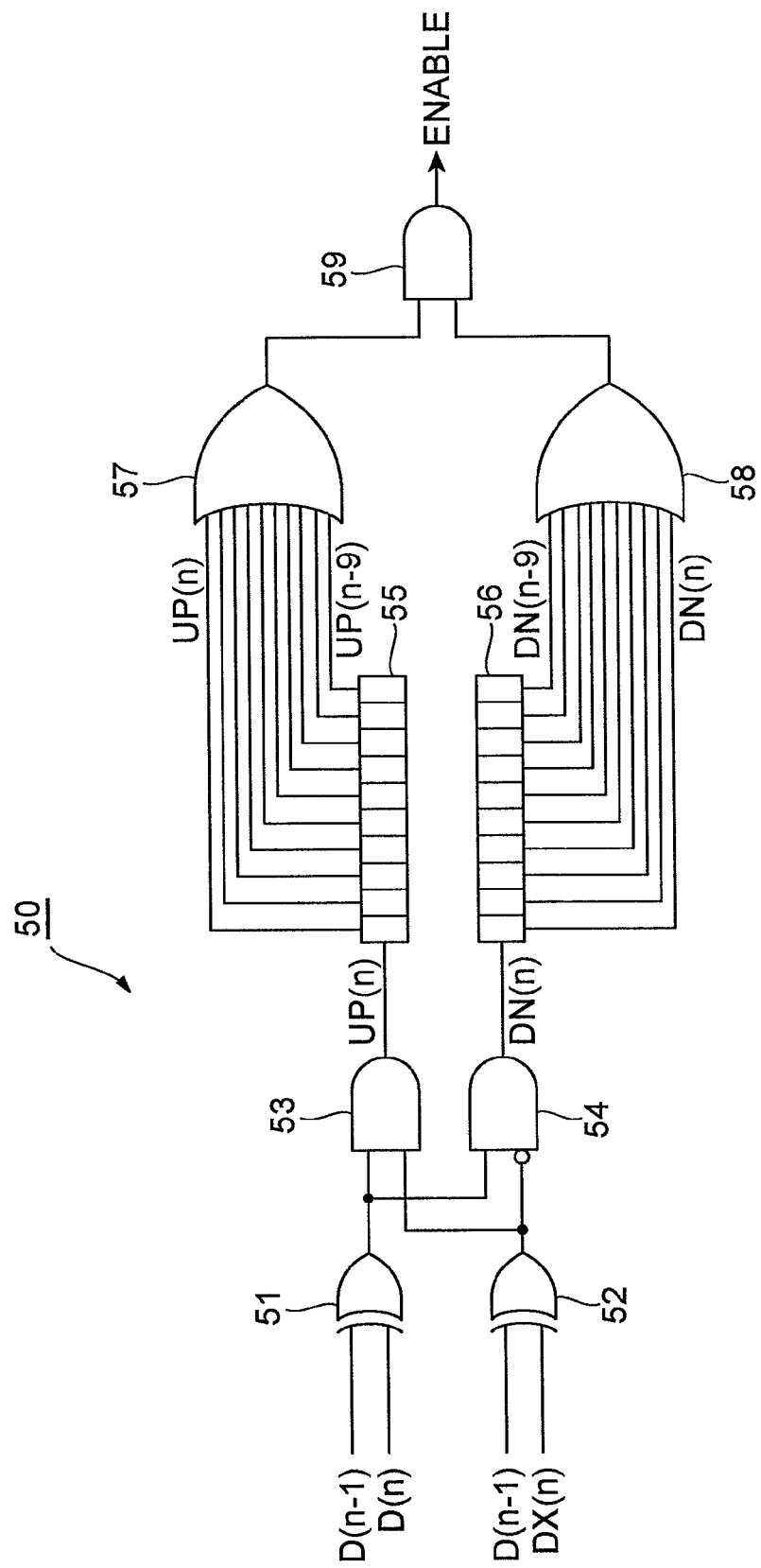
FIG. 8 is a circuit diagram of a phase monitor 50 comprised in the clock data restoration device 1 according to the embodiment.

FIG. 8 is a circuit diagram of the phase monitor 50 comprised in the clock data restoration device 1 according to the present embodiment. The phase monitor 50 comprises exclusive-OR circuits 51 and 52, AND circuits 53 and 54, shift register circuits 55 and 56, OR circuits 57 and 58, and an AND circuit 59.

The exclusive-OR circuit 51 receives an input of the value D(n−1) and value D(n) and outputs the exclusive-OR value of these two values. The exclusive-OR circuit 52 receives an input of value D(n−1) and value DX(n) and outputs the exclusive-OR value of these two values. The AND circuit 53 receives an input of the respective output values of the exclusive-OR circuit 51 and exclusive-OR circuit 52, and outputs a value UP(n) which is the logical AND value of the two values. The AND circuit 54 receives an input of the output value of the exclusive-OR circuit 51 and a logical NOT value of the output value of the exclusive-OR circuit 52, and outputs a value DN(n) which is the logical AND value of the these two values. That is, the value UP(n) is a significant value when "D(n−1)≠DX(n−1)=D(n)" and the value DN(n) is a significant value when "D(n−1)=DX(n−1)≠D(n)".

In each period T(n), the shift register circuit 55 receives an input of the value UP(n) outputted by the AND circuit 53, and stores and outputs values UP(n−9) to UP(n) of ten previous consecutive periods (T(n−9) to T(n)) which include the period. In each period T(n), the shift register circuit 56 receives an input of value DN(n) outputted by the AND circuit 54, and stores and outputs values DN(n−9) to DN(n) of ten previous consecutive periods (T(n−9) to T(n)) which include the period.

The logical OR circuit 57 receives an input of values UP(n−9) to UP(n) outputted by the shift register circuit 55 and outputs the OR value of these ten values. The logical OR circuit 58 receives an input of values DN(n−9) to DN(n) outputted by the shift register circuit 56 and outputs the OR value of these ten values. The AND circuit 59 receives an input of the values outputted by the logical OR circuit 57 and the logical OR circuit 58 and outputs a value ENABLE which is the logical AND value of these two values.

That is, when at least one of the values UP(n−9) to UP(n) is a significant value and at least one of the values DN(n−9) to DN(n) is a significant value, the value ENABLE outputted by the AND circuit 59 is a significant value. On the other hand, when all the values UP(n−9) to UP(n) are non-significant values or when all the values DN(n−9) to DN(n) are non-significant values, the value ENABLE outputted by the AND circuit 59 is a non-significant value. The fact that the value ENABLE is a non-significant value indicates that the phase difference between the clock signal CK and the digital signal is greater than a predetermined value.

The value ENABLE may be outputted by the phase monitor 50 once in each period T(n) or once every M periods (10 periods, for example). In the former case, the value ENABLE is determined for ten previous consecutive periods (T(n−9) to T(n)) which include a certain period T(n), and the subsequent value ENABLE is determined for the ten periods (T(n−8) to T(n+1)) in the next period T(n+1). In the latter case, the value ENABLE is determined for ten previous consecutive periods (T(n−9) to T(n)) which include a certain period T(n), and the next value ENABLE is determined for the ten periods (T(n+M−9) to T(n+M)) after M periods therefrom.

An account follows next on the rationale for judging, over ten periods, whether or not there exists a period in which the UP signal and the DN signal have significant values. Specifically, when there is a data transition between a certain bit of the input digital signal and the next bit, either the UP signal or the DN signal has a significant value and the other has a non-significant value. In cases where there is no data transition between a certain bit and the next bit of the input digital signal, both the UP signal and the DN signal have non-significant values.

If the phases of the clock signal CK and clock signal CKX are suitable, then there exists, over a certain plurality of consecutive periods, a period in which the UP signal has a significant value and also a period in which the DN signal has a significant value. If the phases of the clock signal CK and clock signal CKX are shifted, however, the UP signal has a non-significant value at all times, or the DN signal has a non-significant value at all times, over a certain plurality of consecutive periods.

In 8B10B encoding, which is employed in serial data communications, data transition is guaranteed two or more times in 10 bits. Therefore, if the phases of the clock signal CK and clock signal CKX are suitable upon determining whether there exists a period in which the UP signal and the DN signal have both significant values over ten periods, then a period in which the UP signal has a significant value exists of necessity among the ten periods, and a period in which the DN signal has a significant value exists likewise of necessity among the ten periods.

Conversely, when the DN signal always has a non-significant value over ten periods, or when the UP signal always has a non-significant value over ten periods, it is judged that the phases of the clock signal CK and the clock signal CKX are shifted, and, consequently, the shift from a reasonable value of an offset amount Voff cannot be accurately detected. For the reasons above, it is preferable to determine whether or not there exists a period in which the UP signal and DN signal have significant values, over ten periods.

The value ENABLE outputted by the phase monitor 50 is inputted to the equalizer controller 40. When the value ENABLE is a significant value, the equalizer controller 40 controls the level adjustment amount of the high frequency component of digital signal (that is, the gain of the high frequency component of the input digital signal) by the equalizer 10. By contrast, when the value ENABLE is a non-significant value, the equalizer controller 40 stops the control of the level adjustment amount of the digital signal by the equalizer 10.

Figure 9:
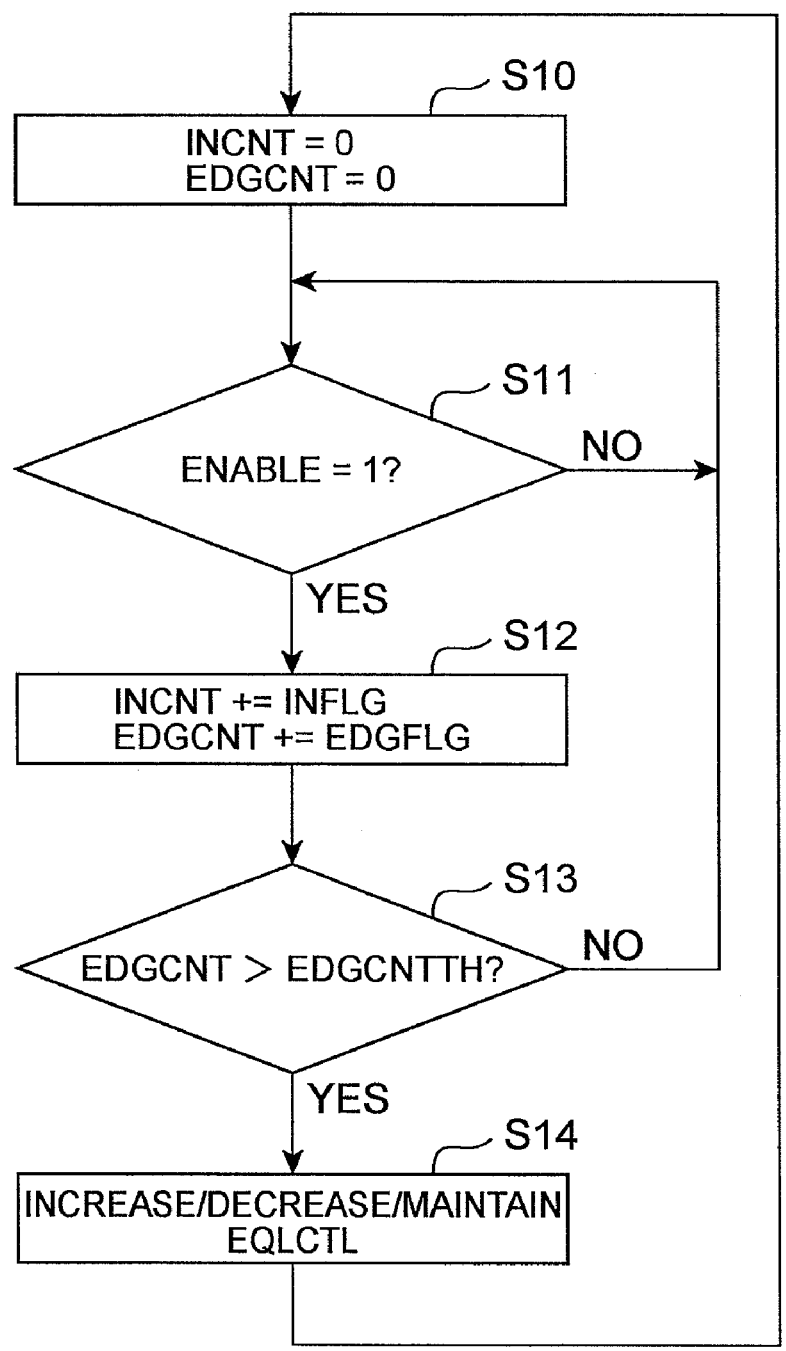
FIG. 9 is a flowchart for explaining the processing of an equalizer controller 40 comprised in the clock data restoration device 1 according to the embodiment.
Figure 10:
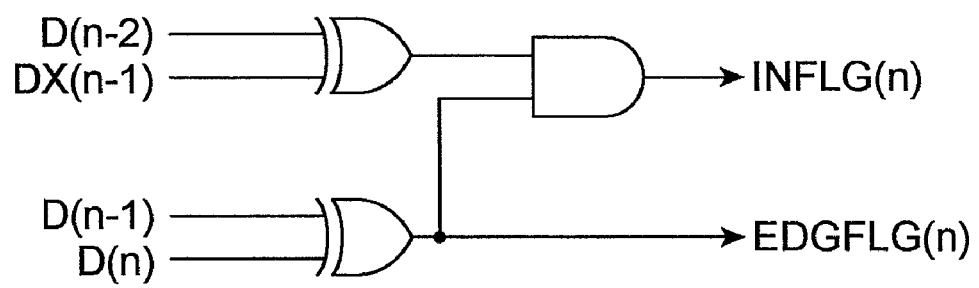
FIG. 10 is a circuit diagram for determining respective values of a variable INFLG and a variable EDGFLG which are used in the processing of the equalizer controller 40 comprised in the clock data restoration device 1 according to the embodiment.

FIG. 9 is a flowchart for explaining processing by the equalizer controller 40 comprised in the clock data restoration device 1 according to the present embodiment. The equalizer controller 40 uses the value ENABLE outputted by the phase monitor 50 and uses a variable INCNT, a variable EDGCNT, a variable INFLG, a variable EDGFLG, a constant INCNTTH, and a constant EDGCNTTH to determine a value EQLCTL that is to be outputted to the amplifier circuit 12 comprised in the equalizer 10. The respective values of the variable INFLG and the variable EDGFLG are determined from value D(n) and value DX(n) by means of the logic circuit shown in FIG. 10, and are represented as "EDGFLG(n)=D(n−1) to D(n)" and "INFLG(n)=EDGFLG(n)*{D(n−2) to DX(n−1)}". Here, the operation symbol "^" represents exclusive-OR.

In step S10, the respective values of the variable INCNT and the variable EDGCNT are set to an initial value 0. In the subsequent step S11, it is judged whether the value ENABLE, outputted by the phase monitor 50, is a significant value; if the value ENABLE is a significant value, the process advances to step S12, otherwise, the process stops at step S11. In step S12, the value of the variable INFLG is added to the value of the variable INCNT, such that the addition value becomes a new value for the variable INCNT. In step S12, moreover, the value of the variable EDGFLG is added to the value of the variable EDGCNT, such that the addition value becomes a new value for the variable EDGCNT.

In the subsequent step S13, it is judged whether the value of the variable EDGCNT is greater than a constant EDGCNTTH; if so, the process advances to step S14, while if the value of the variable EDGCNT is equal to or less than the constant EDGCNTTH, the process returns to step S11. That is, the processing in steps S11 to S13 is carried out until it is judged in step S13 that the value of the variable EDGCNT is greater than the constant EDGCNTTH.

The processing of steps S11 to S13 in the equalizer controller 40 may be performed once in each period T(n), as in the case of the output of the value ENABLE in the phase monitor 50, or may be performed once every M periods (for instance, 10 periods). In the latter case, the total value of variable INFLG outputted for the M periods is added in step S12 to the value of the variable INCNT, and the total value of variable EDGFLG obtained for the M periods is added to the value of the variable EDGCNT.

In step S14 there are performed different types of processing, divided into three cases (a) to (c) below. Specifically, in case that the value of the variable INCNT is smaller than the constant INCNTTH, the value EQLCTL is increased and the new value EQLCTL is notified to the amplifier circuit 12. In case that the value of the variable INCNT is greater than a value obtained by subtracting the constant INCNTTH from the value of the variable EDGCNT, the value EQLCTL is reduced and the new value EQLCTL is notified to the amplifier circuit 12. In cases other than these two, the value EQLCTL is maintained. When the processing of step S14 is over, the process returns to step S10, and the processing explained thus far is repeated.

(Formula 1)

If "INCNT<INCNTTH"→Increase EQLCTL (a)

If "INCNT>EDGCNT−INCNTTH"→Decrease EQLCTL (b)

Else→Maintain EQLCTL (c)

As a result of the above processing by the equalizer controller 40, the value EQLCTL is adjusted in such a manner that the value of the variable INCNT lies within a given appropriate range (INCNTTH to EDGCNT−INCNTTH), to adjust thereby the level adjustment amount of the high frequency component of the digital signal in the equalizer 10. Thus, the level adjustment amount of the high frequency component of the digital signal in the equalizer 10 is set to a value lying within an appropriate range.

When in the equalizer controller 40 the value ENABLE outputted by the phase monitor 50 is a significant value (i.e. when at least one of the values UP(n−9) to UP(n) is a significant value and at least one of the values DN(n−9) to DN(n) is a significant value), the equalizer controller 40 refers to the value D and value DX during this time, upon update of the value EQLCTL, and controls the level adjustment amount of the high frequency component of the digital signal in the equalizer 10.

However, when in the equalizer controller 40 the value ENABLE outputted by the phase monitor 50 is a non-significant value (i.e. when all the values UP(n−9) to UP(n) are non-significant values or when all of values DN(n−9) to DN(n) are non-significant values), the phase difference between the clock signal CK and the digital signal is greater than a predetermined value, and hence the equalizer controller 40 does not refer to the value D and value DX during this time, upon update of the value EQLCTL, and stops controlling the level adjustment amount of the high frequency component of the digital signal in the equalizer 10.

In the clock data restoration device 1 according to the present embodiment, thus, the level adjustment amount of the high frequency component of a digital signal by the equalizer 10 can be set to a value lying within an appropriate range, even in case of, for instance, fluctuations of the loss undergone by the digital signal upon transmission. The clock digital signal and data can be restored more accurately as a result.

Figure 11:
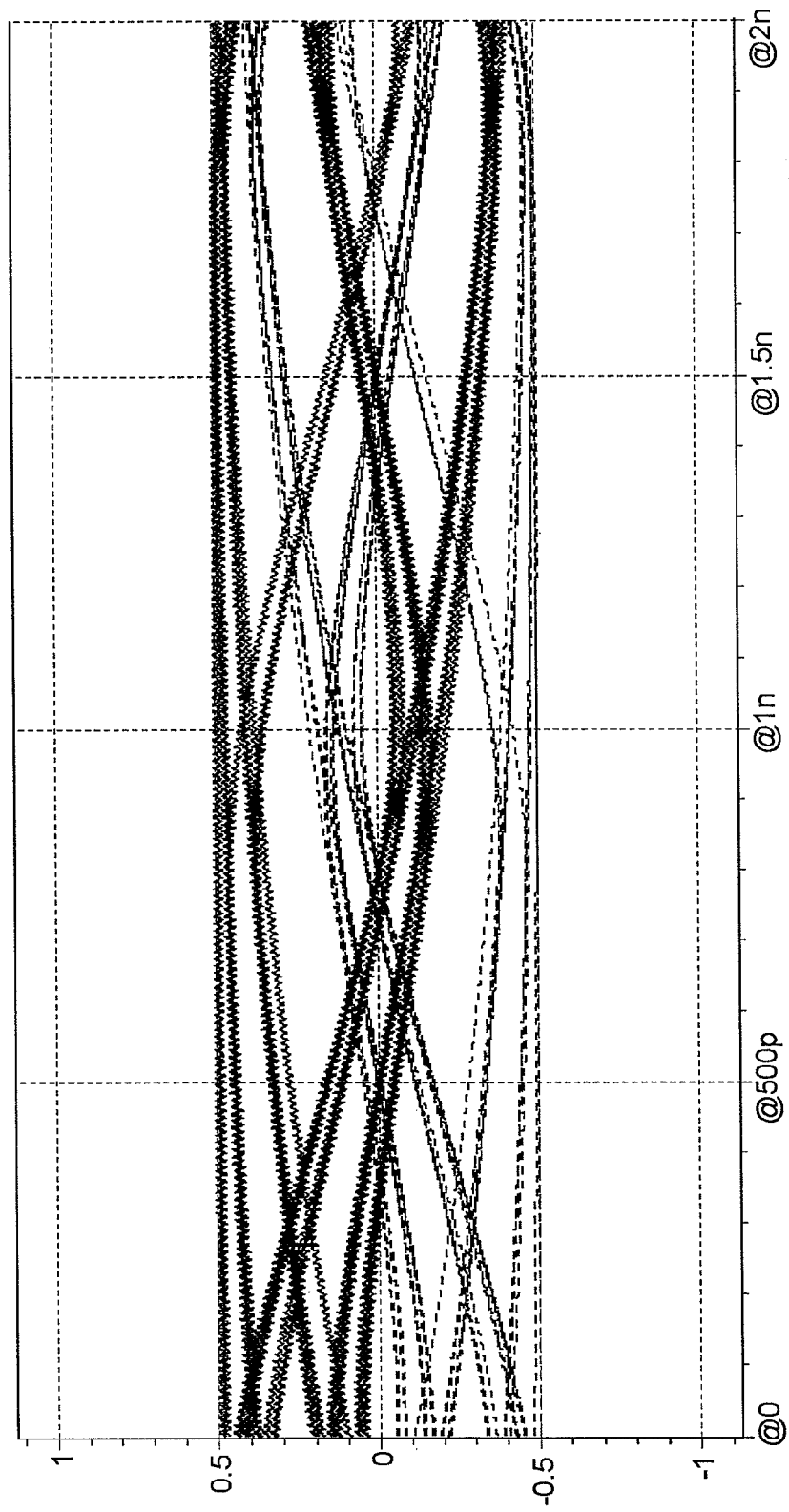
FIG. 11 is a diagram illustrating waveforms of a digital signal inputted to the equalizer 10 comprised in the clock data restoration device 1 according to the embodiment.
Figure 12:
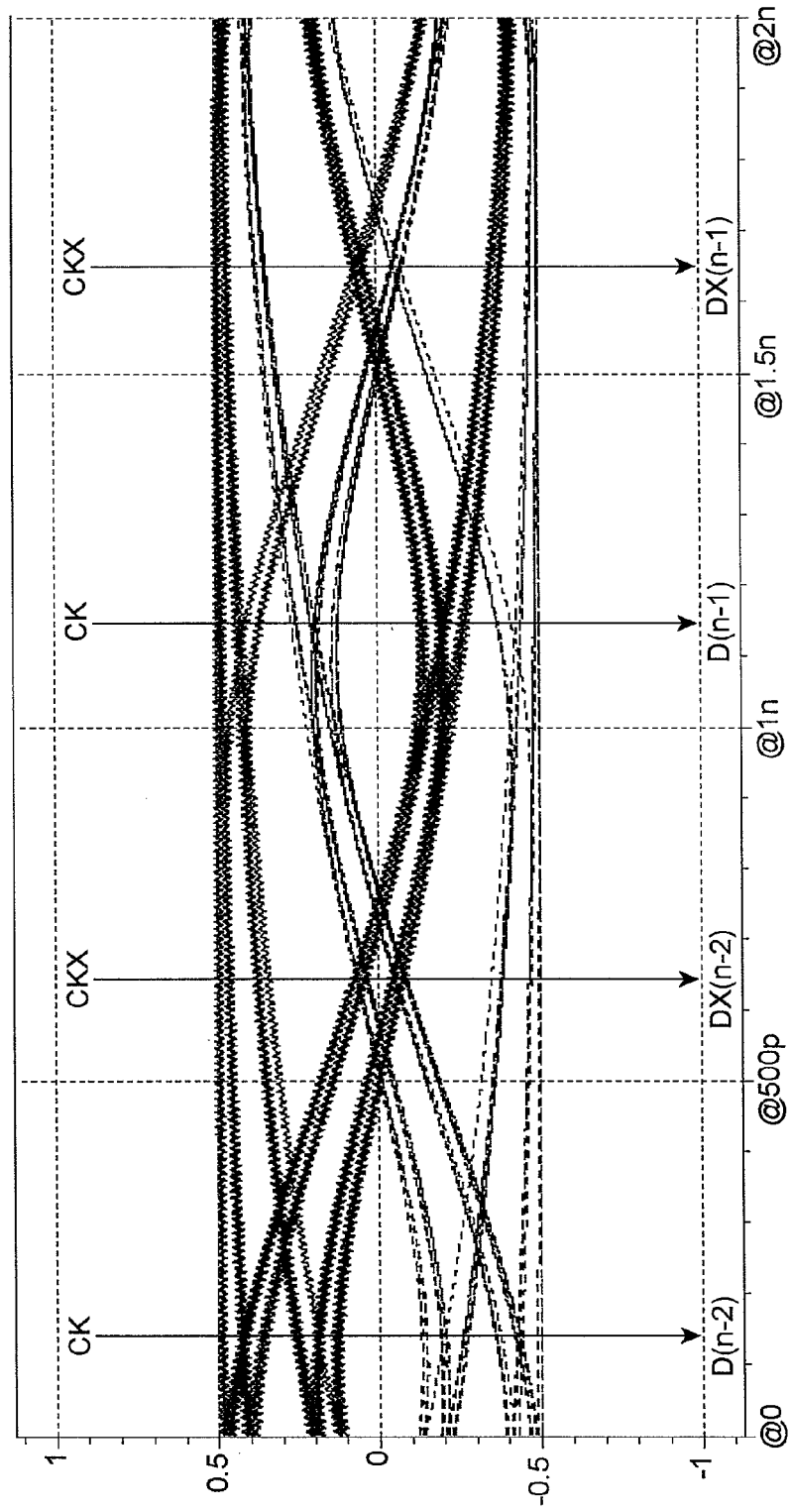
FIG. 12 is a diagram illustrating waveforms of a digital signal outputted by the equalizer 10 comprised in the clock data restoration device 1 according to the embodiment.
Figure 13:
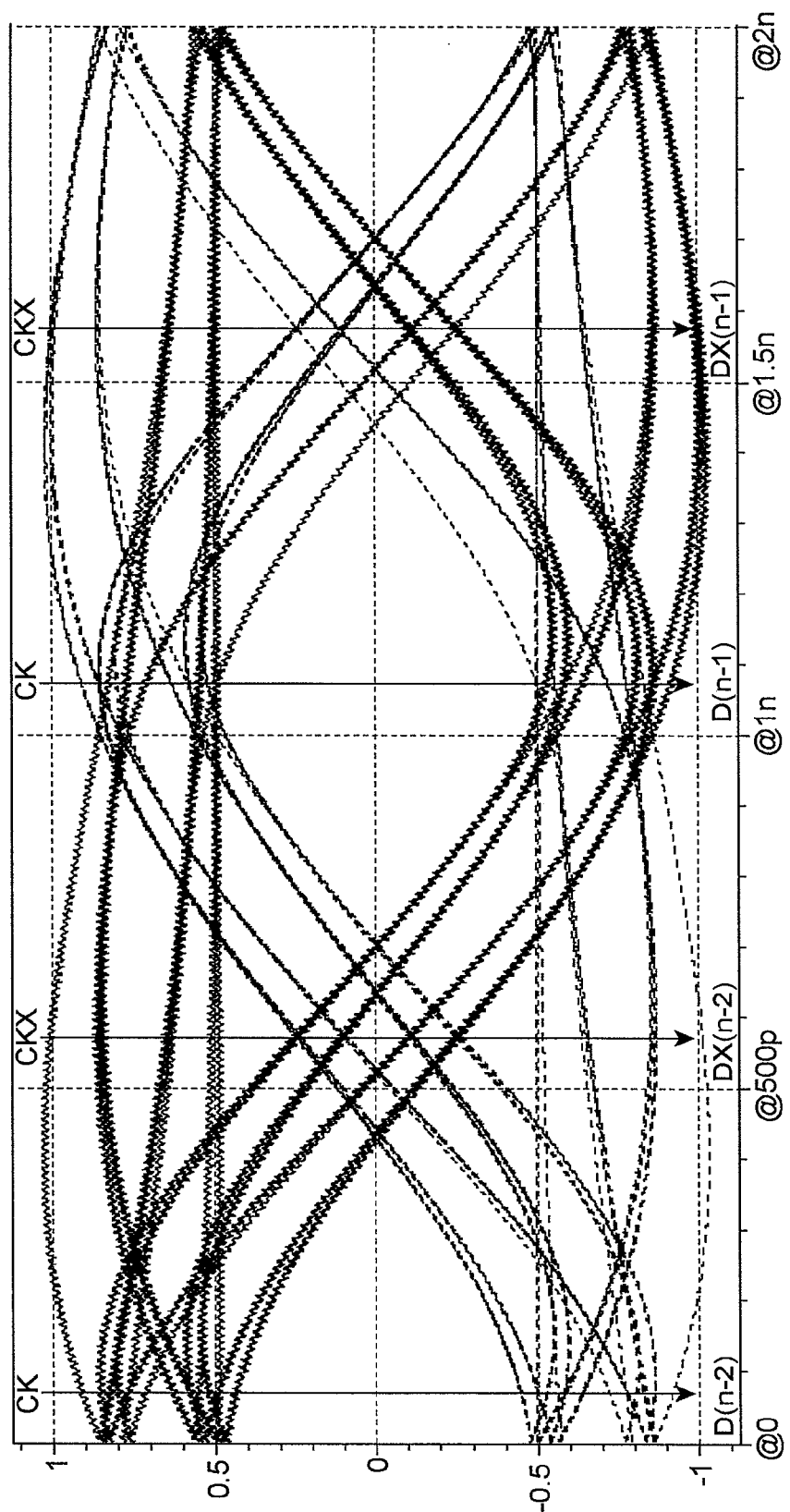
FIG. 13 is a diagram illustrating waveforms of a digital signal outputted by the equalizer 10 comprised in the clock data restoration device 1 according to the embodiment.
Figure 14:
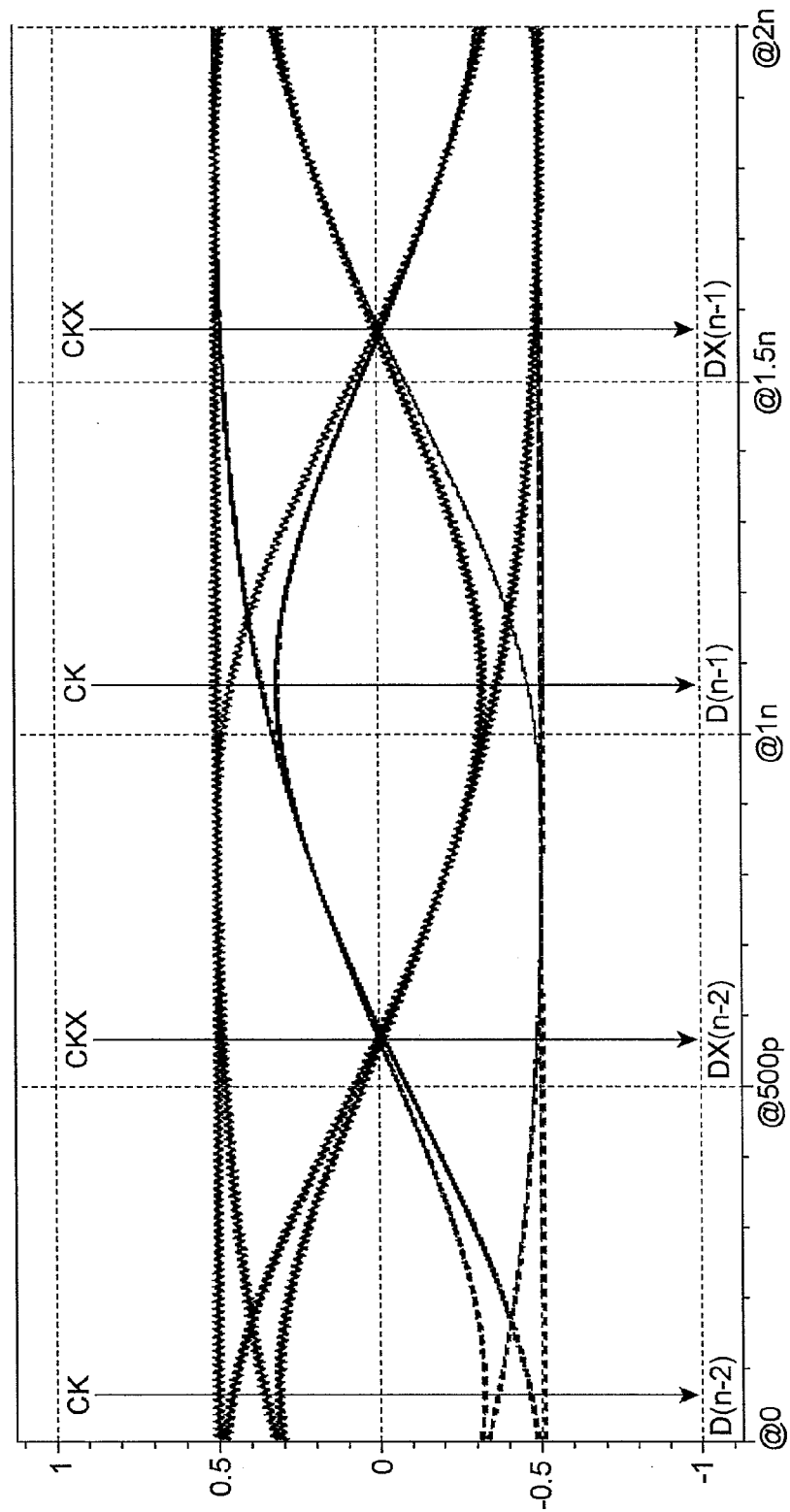
FIG. 14 is a diagram illustrating waveforms of a digital signal outputted by the equalizer 10 comprised in the clock data restoration device 1 according to the embodiment.

FIG. 11 is a diagram illustrating waveforms of a digital signal inputted to the equalizer 10 comprised in the clock data restoration device 1 according to the present embodiment. In the graphs, @X in the abscissa axis represents position at X seconds, and the ordinate axis represents voltage (arbitrary constant). FIGS. 12 to 14 are diagrams illustrating waveforms of a digital signal outputted by the equalizer 10 comprised in the clock data restoration device 1 according to the present embodiment. FIGS. 12 to 14 are simulation results of digital signal waveforms outputted by the equalizer 10 when digital signals having the waveforms illustrated in FIG. 11 are inputted to the equalizer 10. FIG. 12 illustrates a case where the value EQLCTL is smaller than an appropriate range (case (a) above). FIG. 13 illustrates a case where the value EQLCTL is greater than an appropriate range (case (b) above). FIG. 14 illustrates a case where the value EQLCTL lies within an appropriate range (case (c) above).

As illustrated in FIG. 12, when the value EQLCTL is smaller than an appropriate range, compensation (gain during amplification of the high frequency component) in the equalizer 10 is undersize, so that the high frequency component of the output digital signal after compensation remains small, and the range of level fluctuation upon data transition between bits of the digital signal is large.

On the other hand, when the value EQLCTL is larger than an appropriate range, compensation (gain during amplification of the high frequency component) in the equalizer 10 is oversize, so that there increases high frequency component of the output digital signal after compensation, and the range of level fluctuation upon data transition between bits of the digital signal becomes greater than that of the input digital signal, as illustrated in FIG. 13.

When the value EQLCTL lies within an appropriate range, compensation (gain during amplification of the high frequency component) in the equalizer 10 lies within a appropriate range, as illustrated in FIG. 14, so that the output digital signal after compensation becomes substantially flat within the signal band, while there decreases the range of level fluctuation upon data transition (at the time indicated by the clock signal CKX) between bits of the digital signal, and there opens a large eye at the bit center time (time indicated by the clock signal CK).

In the clock data restoration device 1 according to the present embodiment, the equalizer controller 40 performs control in such a manner that the value EQLCTL is kept within an appropriate range, so as to reduce the range of level fluctuation upon data transition between bits of the digital signal outputted by the equalizer 10, as illustrated in FIG. 14. This allows the clock signal and data to be restored stably, even in case of substantial transmitter clock jitter and/or intersymbol interference.

As illustrated in FIGS. 12 to 14, the output waveform of the equalizer is blunted and the eye opening becomes smaller depending on the pattern. The cross-points must be reduced in order to expand the eye opening. In the waveforms illustrated in FIGS. 12 to 14, D(n−2), D(n−1) and D(n) are CK sampling results, while DX(n−1) is a CKX sampling result. In a transition from D(n−1) to D(n), i.e. assuming an instance limited to D(n−1)≠D(n), DX(n−1) becomes High when D(n−2) is High, and DX(n−1) becomes Low when D(n−2) is Low, with the equalizer undersize waveforms of FIG. 12.

With the equalizer oversize waveforms of FIG. 13, when D(n−2) is High, DX(n−1) becomes Low, and when D(n−2) is Low, DX(n−1) becomes High. With the equalizer oversize waveforms of FIG. 14, DX(n−1) does not depend on the value of D(n−2). Therefore, when D(n−1)^D(n) is High, the number of Highs and Lows for D(n−2)^DX(n−1) may be identical.

In FIG. 9, EDGCNT counts the number of D(n−1)^D(n) Highs, while INCNT counts the number of D(n−2)^DX(n−1) Highs. The equalizer is optimally controlled by controlling EQLCTL so that there holds "INCNT≅0.5×EDGCNT".

The invention claimed is:

1. A clock data restoration device which restores a clock signal and data on the basis of an inputted digital signal, comprising:
    an equalizer which adjusts the level of a high frequency component of the inputted digital signal and outputs the adjusted digital signal;
    a sampler which receives an input of a clock signal CK and a clock signal CKX which have a same cycle T, and an input of the digital signal outputted by said equalizer, and which samples, holds, and outputs a value D(n) of said digital signal at a time $t_C$ indicated by said clock signal CK, and samples, holds, and outputs a value DX(n) of said digital signal at a time $t_X$ indicated by said clock signal CKX, in each n-th period T(n) of the cycle;
    a clock generator which, in each period T(n), adjusts the cycle T or a phase on the basis of the value D(n) and the value DX(n) outputted by said sampler, in such a manner that a phase difference between said clock signal CK and said digital signal decreases, and outputs to said sampler said clock signal CK and said clock signal CKX satisfying a relationship $t_X - t_C = T/2$; and
    an equalizer controller which, in each period T(n), controls a level adjustment amount of the high frequency component of said digital signal by said equalizer, on the basis of the value D(n) and the value DX(n) outputted by said sampler;
    wherein $t_C < t_X$ and n is an integer.

2. The clock data restoration device according to claim 1, wherein said clock generator adjusts the cycle T or the phase on the basis of an UP signal which has a significant value when D(n−1)≠DX(n−1)=D(n) and a DN signal which has a significant value when D(n−1)=DX(n−1)≠D(n), and outputs said clock signal CK and said clock signal CKX.

3. The clock data restoration device according to claim 1, further comprising
    a phase monitor which, in each period T(n), detects a phase relationship between said clock signal CK and said digital signal, on the basis of the value D(n) and the value DX(n) outputted by said sampler, and, when the phase difference is greater than a predetermined value, stops control of the level adjustment amount of said digital signal by said equalizer controller.

4. The clock data restoration device according to claim 3, wherein said phase monitor detects a phase relationship between said clock signal CK and said digital signal on the basis of an UP signal which has a significant value when D(n−1)≠DX(n−1)=D(n) and a DN signal which has a significant value when D(n−1)=DX(n−1)≠D(n).

5. The clock data restoration device according to claim 4, wherein in each period T(n), when either the UP signal or the DN signal does not have a significant value in ten previous consecutive periods (T(n−9) to T(n)) which include the period, said phase monitor judges that the phase difference is greater than the predetermined value, and stops control of the level adjustment amount of said digital signal by said equalizer controller.

* * * * *